June 4, 1940.

J. MUSERLIAN 2,203,541

SLIDING BLADE SCISSORS

Filed Nov. 16, 1939

INVENTOR
John Muserlian
BY
ATTORNEY

Patented June 4, 1940

2,203,541

UNITED STATES PATENT OFFICE 2,203,541

SLIDING BLADE SCISSORS

John Muserlian, New York, N. Y.

Application November 16, 1939, Serial No. 304,722

6 Claims. (Cl. 30—266)

This invention relates to new and useful improvements in a pair of sliding blade scissors.

More specifically, the invention proposed the construction of a pair of scissors characterized by the provision of a pair of opposed front pointed cutting blades of equal length pivotally connected together in a manner to normally have their front pointed ends disposed adjacent one another.

Still further it is proposed to provide the pivot of said blades with a means whereby said blades may be shifted relative to each other in a manner to cause one of said pointed ends to be resiliently urged into a position in which it will extend beyond the end of the other of said pointed ends.

Still further it is proposed to construct these scissors in the above manner to permit the pointed ends to be disaligned when desired for causing the projected pointed end to remain in position beneath the material being cut, when the blades are moved to cut for causing the pointed end to retain the scissors in a proper cutting position in relation to the material being cut.

Still further it is proposed to provide one of said blades with an elongated slot through which the pivot extends and which is provided with a resilient means for urging said pivot into a position in which it will engage one or the other ends of said slots for causing the blades of said scissors to be urged into adjacent positions or positions in which one pointed end extends beyond the other.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Figure 1:
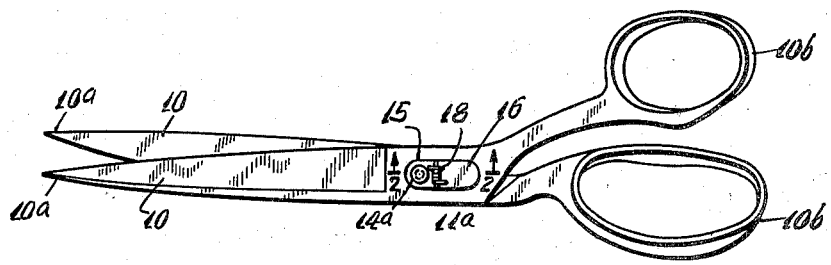
Fig. 1 is an elevational view of a pair of scissors constructed in accordance with this invention and having its blades arranged adjacent one another.
Figure 2:
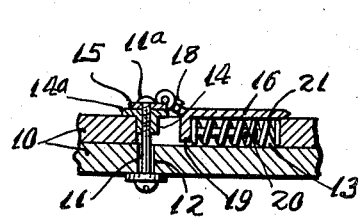
Fig. 2 is an enlarged sectional view taken on the line 2—2 of Fig. 1.
Figure 3:
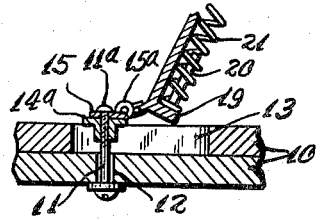
Fig. 3 is a view similar to Fig. 2 illustrating the position of the parts when the blades of the shears are being shifted relative to each other.

The sliding blade scissors, according to this invention, includes a pair of opposed cutting blades 10 of equal length and having pointed ends 10a. These blades are constructed of metal and at their rear ends continue into handles 10b by which the scissors may be conveniently operated for causing the blades to cut. A pivot headed screw 11 is engaged through a socket receiving opening 12 formed in one of the blades 10 and extends through a longitudinal slot 13 formed in the other of the blades 10. A bushing 14 is threadedly engaged upon the pivot screw 11 and is slidably extended into the slot 13 and has a flange 14a for holding the blades in position upon the pivot screw 11. The bushing 14 is formed with flat sides 14b which engage the side walls of the slot 13 for holding the same against turning when the pivot screw 11 is being threadedly engaged through the bushing 14.

The pivot screw 11 has its end extend beyond the outer face of the flange 14a thereof and has a member 15 turnably mounted thereon. This member 15 rests upon the face of the flange 14a and after it is positioned upon the extended end of the pivot screw 11 the said end is milled over at 11a for retaining the member in position thereon. One side of the member 15 is provided with a coil 15a and a strip 16 having a similarly coiled portion 16a which is pivotally mounted upon the member 15 by means of a pin 17 extended through the coils 15a and 16a. A resilient means is provided for urging the strip 16 to a position in which it will engage the face of the slotted blade 10. This means comprises a coaxial spring 18 mounted upon the pin 17 and which has one of its ends engaging the face of the member 15 and the other of its ends engaging the face of the strip 16. Thus the strip 16 may be manually pivoted away from the slotted blade 10 and will be immediately urged back to its normal position by the spring 18 when released.

Figure 4:
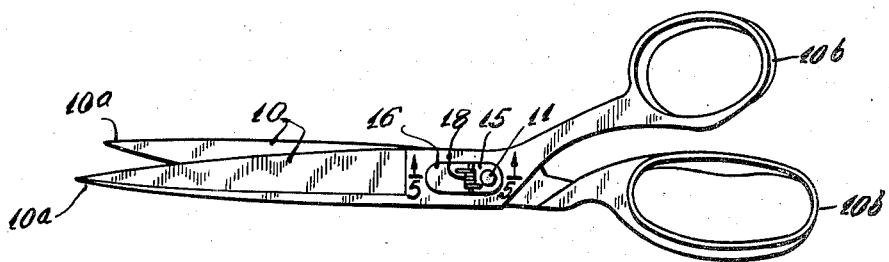
Fig. 4 is a view similar to Fig. 1 but illustrating the position of the blades as adjusted.
Figure 5:
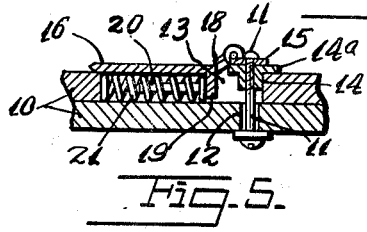
Fig. 5 is an enlarged sectional view taken on the line 5—5 of Fig. 4.
Figure 6:
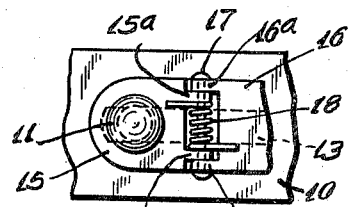
Fig. 6 is an enlarged detailed view of a portion of Fig. 1.
Figure 7:
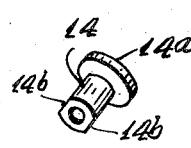
Fig. 7 is a perspective view of the bushing, per se.

The strip 16 is provided with a downwardly extending flange 19 adjacent its pivoted end which is adapted to be extended into the slot 13. This flange 19 carries a pin 20 which in turn carries an expansion spring 21. This expansion spring 21 is adapted to engage one end of the slot 13 and urge the blade 10 having the slot 13 into a position in which the pivot screw 11 will engage the other end of the slot. When the spring 21 engages the back end of the slot 13 the blades 10 will be in a position in which they lay immediately adjacent each other. However, after the strip 16 is pivoted to cause the spring 21 to engage the other end of the slot 13 the blade 10 having the slot 13 will be urged into a position in which its pointed end will extend beyond the pointed end of the other blade 10 as shown in Fig. 4.

The operation of the device is as follows:

When it is desired that the pointed ends of the scissors be in alignment with each other the strip 16 is positioned so that the spring 21 will engage the back end of the slot 13 for resiliently maintaining the blades in this position. However, if it be desired to have the end of one of the blades project beyond the pointed end of the other of the blades it is merely necessary to manually lift the strip 16 against the holding action of the spring 18 and turn the same through 180° about the pivot pin 11. The spring 21 may then be reengaged into the slot 13 to cause the same to bear against the front end of the slot and urge the blade 10 having the slot into a position in which its front end will project beyond the end of the other of said blades.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A sliding blade scissors, comprising a pair of opposed cutting baldes of equal length having front pointed ends, handles on the rear ends of said blades, a pivot headed screw engaging through a socket receiving opening in the rear end of one of said blades and extending through a longitudinal slot in the other blade, a bushing slidably mounted in said slot and having a flanged head engaging the outer face of the slotted blade, said screw being threadedly engaged through said bushing and extending therefrom, a member turnably mounted on said extended end of said screw, a strip hingedly and resiliently mounted on said member and being urged towards said slotted blade, and a spring mounted on said strip and engaging in said slot and urging said blades into position in which said pointed ends are resiliently adjacent each other, whereby the member may be turned into a position in which said spring urges said blades into positions in which said pointed ends are resiliently held one to the front of the other.

2. A sliding blade scissors, comprising a pair of opposed cutting blades of equal length having front pointed ends, handles on the rear ends of said blades, a pivot headed screw engaging through a socket receiving opening in the rear end of one of said blades and extending through a longitudinal slot in the other blade, a bushing slidably mounted in said slot and having a flanged head engaging the outer face of the slotted blade, said screw being threadedly engaged through said bushing and extending therefrom, a member turnably mounted on said extended end of said screw, a strip hingedly and resiliently mounted on said member and being urged towards said slotted blade, and a spring mounted on said strip and engaging in said slot and urging said blades into position in which said pointed ends are resiliently adjacent each other, whereby the member may be turned into a position in which said spring urges said blades into positions in which said pointed ends are resiliently held one to the front of the other, said bushing having flat sides engaging the side walls of said slot for preventing said bushing from turning while said screw is being threadedly engaged therethrough.

3. A sliding blade scissors, comprising a pair of opposed cutting blades of equal length having front pointed ends, handles on the rear ends of said blades, a pivot headed screw engaging through a socket receiving opening in the rear end of one of said blades and extending through a longitudinal slot in the other blade, a bushing slidably mounted in said slot and having a flanged head engaging the outer face of the slotted blade, said screw being threadedly engaged through said bushing and extending therefrom, a member turnably mounted on said extended end of said screw, a strip hingedly and resiliently mounted on said member and being urged towards said slotted blade, and a spring mounted on said strip and engaging in said slot and urging said blades into position in which said pointed ends are resiliently adjacent each other, whereby the member may be turned into a position in which said spring urges said blades into positions in which said pointed ends are resiliently held one to the front of the other, said resilient mounting of said strip comprising a pivot pin for pivotally connecting said strip to said member, and a spring mounted on said pin and having one end engaging said strip and the other end engaging said member.

4. A sliding blade scissors, comprising a pair of opposed cutting blades of equal length having front pointed ends, handles on the rear ends of said blades, a pivot headed screw engaging through a socket receiving opening in the rear end of one of said blades and extending through a longitudinal slot in the other blade, a bushing slidably mounted in said slot and having a flanged head engaging the outer face of the slotted blade, said screw being threadedly engaged through said bushing and extending therefrom, a member turnably mounted on said extended end of said screw, a strip hingedly and resiliently mounted on said member and being urged towards said slotted blade, and a spring mounted on said strip and engaging in said slot and urging said blades into position in which said pointed ends are resiliently adjacent each other, whereby the member may be turned into a position in which said spring urges said blades into positions in which said pointed ends are resiliently held one to the front of the other, said strip having a downwardly extending flange adjacent its pivoted end and which normally extends into said slot, and a means on said flange for normally retaining said spring in position thereon.

5. A sliding blade scissors, comprising a pair of opposed cutting blades of equal length having front pointed ends, handles on the rear ends of said blades, a pivot headed screw engaging through a socket receiving opening in the rear end of one of said blades and extending through a longitudinal slot in the other blade, a bushing slidably mounted in said slot and having a flanged head engaging the outer face of the slotted blade, said screw being threadedly engaged through said bushing and extending therefrom, a member turnably mounted on said extended end of said screw, a strip hingedly and resiliently mounted on said member and being urged towards said slotted blade, and a spring mounted on said strip and engaging in said slot and urging said blades into position in which said pointed ends are resiliently adjacent each other, whereby the member may be turned into a position in which said spring urges said blades into positions in which said pointed ends are resiliently held one to the front of the other, said strip having a downwardly extending flange adjacent its pivoted end and which normally extends into said slot, and a means on said flange for normally retaining said spring in position thereon, said means comprising a pin extended from the face of said flange and parallel to said strip and extended coaxially through said spring.

6. A sliding blade scissors, comprising a pair of opposed cutting blades of equal length having front pointed ends, handles on the rear ends of said blades, a pivot headed screw engaging through a socket receiving opening in the rear end of one of said blades and extending through a longitudinal slot in the other blade, a bushing slidably mounted in said slot and having a flanged head engaging the outer face of the slotted blade, said screw being threadedly engaged through said bushing and extending therefrom, a member turnably mounted on said extended end of said screw, a strip hingedly and resiliently mounted on said member and being urged towards said slotted blade, and a spring mounted on said strip and engaging in said slot and urging said blades into position in which said pointed ends are resiliently adjacent each other, whereby the member may be turned into a position in which said spring urges said blades into positions in which said pointed ends are resiliently held one to the front of the other, said member being turnably retained in position upon said pivot pin by milling over the end thereof.

JOHN MUSERLIAN.